INVENTOR.
Henry Greber

United States Patent Office 3,500,452
Patented Mar. 10, 1970

3,500,452
INCANDESCENT LAMP WITH A SOLID GLASS
BODY SERVING AS THE ENVELOPE
Henry Greber, 225 W. 80th St., Apt. 8–D,
New York, N.Y. 10024
Filed Dec. 7, 1967, Ser. No. 688,872
Int. Cl. H01j 1/20
U.S. Cl. 313—9                                     1 Claim

ABSTRACT OF THE DISCLOSURE

This invention is related to an incandescent lamp whose filament is surrounded with particles of thorium oxide and enclosed in an essentially spherical blob of glass, constituting an integral part of the lamp's bulb. Whereas the glass at the filament is melted at operation of the lamp, it remains solid at the surface of the blob, so that the pressure of the melted glass prevents the filament from evaporation. The thorium oxide at the filament is incandescent and thereby increases the light output of the bulb. Curved surfaces of the blob serve as reflectors. Due to enclosure of the filament in the glass blob, it may be operated at higher temperature than usual in conventional incandescent lamps, and therefore at higher efficiency. For the same reason the life span of this lamp is longer than that of any customary incandescent lamp known.

---

This invention is related to an incandescent lamp whose filament is surrounded with thorium oxide and enclosed in a blob of glass. Whereas the glass at the filament is melted, it remains solid at the surface of blob, so that the pressure of the glass prevents the filament from evaporation. The thorium oxide at the filament is incandescent and increases the light output of the lamp. Due to the enclosure of its filament in glass, the lamp may be operated at a higher temperature than usually, and therefore with higher efficiency. For the same reason, the life span of this lamp is longer than that of the customary incandescent lamp.

Since its inception and throughout its history, the incandescent lamp has been plagued with its crucial disadvantage, that is with the evaporation of its filament, or sputtering, as it came to be called. Already T. A. Edison had to conduct a lengthy, difficult search to find a filament of a material exhibiting a barely tolerable rate of sputtering in his evacuated incandescent lamp. Soon, the vacuum in the lamp had to be replaced with gas filling in order to keep the evaporation of the filament down. In more recent times, different schemes have been devised to remedy this disadvantage, by returning some of the evaporated material back to the filament. Nevertheless, the problem of filament evaporation of incandescent lamps can by no means be considered as having been solved. The lack of solution to it, makes it impossible to apply the incandescent lamp up to the limits of its potentialities. The temperature of the filament, and therefore the efficiency of the incandescent lamp is comparatively low, and so is its life span. This is the reason for the partial downfall of the incandescent lamp, which is being replaced by other light sources, which, though more complex, are more efficient.

This invention is another attempt at the solution of the filament evaporation problem. The line of attack upon the problem assumed in this specification is to surround the filament with thorium oxide and to enclose it in a blob of glass. The glass will melt at the filament, but it will remain solid at the surface of the blob. To reduce the loss of heat from large lamps, the glass blobs enclosing their filaments are mounted in evacuated bulbs. For small lamps, the glass blobs constitute the bulbs themselves. The details in which the concept of this invention is carried out in different design examples can be seen from this specification and from the accompanying drawing.

Figure 1:
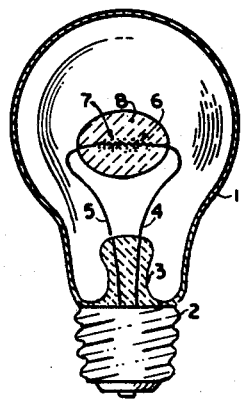
Figure 2:
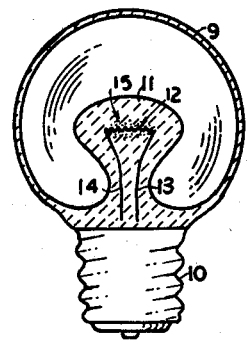
Figure 3:
Figure 4:
Figure 5:
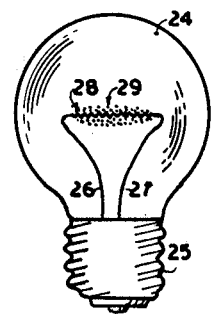

In this drawing, FIGURE 1 shows a cross section of an incandescent lamp whose filament is covered with thorium oxide crystals and enclosed in a blob of glass mounted in an evacuated bulb. Similarly, in FIGURE 2 is shown a cross section of an incandescent lamp, with its filament surrounded with thorium oxide and enclosed in a blob, forming an integral part of the evacuated bulb in which it is placed. In FIGURE 3 is presented a cross section of a bean-shaped convex blob, which is partly mirrorized, whereas in FIGURE 4 is drawn a cross section of a concave, partly mirrorized blob. In FIGURE 5 is shown an elevational view of an incandescent lamp whose bulb is a solid blob of glass enclosing the filament embedded in thorium oxide.

In detailed consideration of the drawing, it can be seen that glass bulb 1, provided with socket 2, comprises stem 3, which carries the lead-in wires 4 and 5, serving to lead current to and from the filament 6. Filament 6 is surrounded with thin layer of thorium oxide 7, and enclosed in glass blob 8. Thorium oxide (thiorianite $ThO_2$) has a melting point of over 2800° C., and a boiling point of 4400° C. Its specific gravity is 9.69. Also cerium oxide (ceric oxide $CeO_2$), having a melting point of 1950° C. and a specific gravity of 7.3 can be used for this purpose. Due to its higher melting point, however, thorium oxide is to be preferred. Both oxides have the property of emanating strong light when heated to high temperatures. The oxides may be directly deposited on the filament, or they can be deposited on thin asbestos threads subsequently wrapped around the filament. The blob may be of clear colorless glass, or it may be tinted for color correction of the light output of the lamp. The larger the wattage of the lamp, the larger must be the blob. For very large ratings, the lamps may contain more than one blob.

In the cross section shown in FIGURE 2, bulb 9 is equipped with socket 10, comprising blob 11. Blob 11 contains filament 12, which is fed through lead wires 13 and 14 and embedded in thorium and cerium oxide particles 15.

Where a dispersed beam of light is desired, the filament can be embedded in a bean-shaped convex glass blob 16, whose cross section is shown in FIGURE 3. Blob 16 contains filament 17 embedded in thorium and cerium oxides 18. The rear part of blob 16 is provided with the mirror layer 19.

If a concentrated beam of light is required, then a concave blob 20, whose cross sectional view is drawn in FIGURE 4, can be applied. This blob, contains filament 21, the thorium and cerium oxides 22, and is provided with the mirrorizing surface 23.

In the elevational view of FIGURE 5, blob 24 is at the same time the bulb of the incandescent lamp. It is provided with socket 25, and comprises wires 26 and 27, feeding filament 25. As in the preceding examples, filament 28 is embedded in thorium and cerium crystals 29.

In operation of this incandescent lamp, the glass near the filament melts, while that at the surface of the blob remains solid. Due to expansion of the glass and of the filament, a pressure is created in the melted glass. This pressure prevents the filament from evaporation. Therefore, it can be operated at a higher temperature, and therefore at a higher efficiency. The efficiency is still more increased due to the thorium and cerium oxide particles which surround the filament. These particles, brought to a high temperature emit intensive light, and thereby increase the total light output of the lamp. For color correction of the light of the lamp, its blob can be tinted with a blue or green color. For prevention of excessive heat dissipation of large incandescent lamps, in order to still further increase their efficiency, the blobs containing their filaments can be mounted inside evacuated bulbs. This measure appears not necessary for small lamps, whose blobs can be used without bulbs, so that they replace such bulbs. The higher the temperature, the more energy is irradiated from the blob. For direction of the produced light flux, metallic mirrorizing surfaces can be used on a part of the blobs. The application of such surfaces is shown for convex and concave blobs. If a thicker thorium and cerium oxide layer is used under the filament, than is over it, some reflection of light into the space above the filament can be achieved. The blob can also take on a form of an extended glass rod containing the filament. For higher lamp ratings, glass of high melting temperature should be used for blobs.

This invention can be applied not only to incandescent lamps, but also to heaters, particularly to radiative heaters in which evaporation of their heater elements is a problem. Incandescent lamps equipped with glass-embedded filaments are not only more efficient and long living than ordinary incandescent lamps, but they are also vibration proof. Many modifications, variations, changes by addition and omission can be made in this invention, without departure from its concept, as defined in the following claims.

The claims defining this invention are:
1. An incandescent lamp comprised of:
a solid glass spherical body, said body serving both as an enclosure for a metallic filament and as an envelope for the lamp,
said filament being embedded in the approximate center of said body and being surrounded by particles from the group consisting of thorium oxide and cerium oxide which incandesce when heated by said filament,
said body being sufficiently large to allow the glass immediately adjacent said filament to be in a molten state during the operation of said lamp while the glass at the surface of said body remains solid.

References Cited
UNITED STATES PATENTS

| | | | |
|---|---|---|---|
| 276,133 | 4/1883 | Clingman | 313—345 X |
| 1,385,608 | 7/1921 | Darrah | 313—9 |
| 1,640,829 | 8/1927 | Heany | 313—9 |
| 2,555,807 | 6/1951 | Morris | 313—315 |
| 3,322,992 | 5/1967 | Parker et al. | 313—315 X |

JAMES W. LAWRENCE, Primary Examiner

DAVID O'REILLY, Assistant Examiner

U.S. Cl. X.R.
313—220, 317